United States Patent
Harris et al.

(10) Patent No.: US 8,636,589 B2
(45) Date of Patent: Jan. 28, 2014

(54) SYSTEMS AND METHODS THAT ENABLE A SPECTATOR'S EXPERIENCE FOR ONLINE ACTIVE GAMES

(75) Inventors: Brett Harris, Los Angeles, CA (US); Carl Kwoh, Los Angeles, CA (US); Paul Sottosanti, Los Angeles, CA (US); Vic Keenan, Los Angeles, CA (US); George Skleres, Los Angeles, CA (US); Jason Cohen, Los Angeles, CA (US)

(73) Assignee: Riot Games, Inc., Santa Monica, CA (US)

( * ) Notice: Subject to any disclaimer, the term of this patent is extended or adjusted under 35 U.S.C. 154(b) by 0 days.

(21) Appl. No.: 13/457,337

(22) Filed: Apr. 26, 2012

(65) Prior Publication Data

US 2013/0288799 A1  Oct. 31, 2013

(51) Int. Cl.
*A63F 13/00* (2006.01)
*G06F 17/00* (2006.01)

(52) U.S. Cl.
USPC .................... 463/29; 463/31; 463/42; 463/43

(58) Field of Classification Search
USPC .......................................... 463/29, 31, 42, 43
See application file for complete search history.

(56) References Cited

U.S. PATENT DOCUMENTS

| | | | | |
|---|---|---|---|---|
| 6,699,127 | B1 * | 3/2004 | Lobb et al. | 463/43 |
| 2003/0038805 | A1 * | 2/2003 | Wong et al. | 345/473 |
| 2003/0220143 | A1 * | 11/2003 | Shteyn et al. | 463/42 |
| 2006/0058103 | A1 * | 3/2006 | Danieli et al. | 463/42 |
| 2007/0117635 | A1 * | 5/2007 | Spanton et al. | 463/43 |
| 2008/0119286 | A1 * | 5/2008 | Brunstetter et al. | 463/43 |
| 2009/0209348 | A1 * | 8/2009 | Roberts et al. | 463/40 |
| 2010/0035691 | A1 * | 2/2010 | Wild et al. | 463/42 |
| 2010/0304869 | A1 * | 12/2010 | Lee et al. | 463/42 |

* cited by examiner

*Primary Examiner* — Lawrence Galka
(74) *Attorney, Agent, or Firm* — Joseph K. Liu; One LLP

(57) ABSTRACT

The field of the invention relates to multi-user online gaming systems, and more particularly to systems and methods that enable a spectator's experience for online active games. In a preferred embodiment, an online multiuser game system includes an online game session server system communicatively coupled to a public network for access by a plurality of users to establish a plurality of real-time interactive games sessions. The online multiuser game system further includes a spectator server communicatively coupled to the online game session server system and configured to enable a user to view and time shift an active game session.

2 Claims, 11 Drawing Sheets

---

Spectator Request

Recommended active games:

Active games by most spectators:

Active games by most requested players:

Active games by game ID:

Active games by player ID:

Select Game

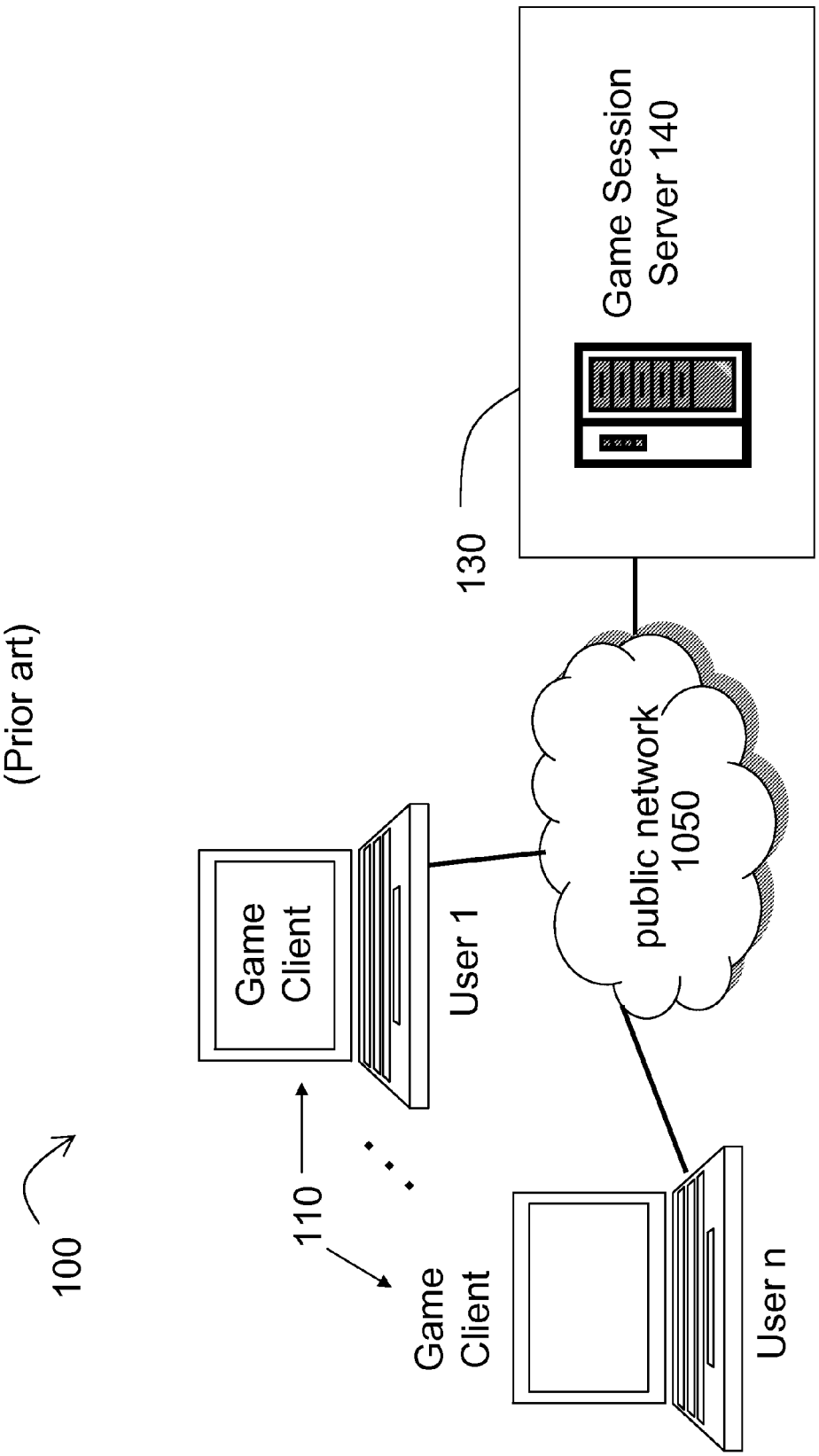

SYSTEMS AND METHODS THAT ENABLE A SPECTATOR'S EXPERIENCE FOR ONLINE ACTIVE GAMES

FIELD OF THE INVENTION

The field of the invention relates to multi-user online gaming systems, and more particularly to systems and methods that enable a spectator's experience for online active games.

BACKGROUND OF THE INVENTION

Like any popular competitive activity, such as football, basketball, card games and board games, multiuser online games have a large following of fans who appreciate competitive games and highly skilled players. Further, like with other games, such fans enjoy being spectators to highly competitive games or games that certain players are participating in. Further, there is a particular desire to witness these games live, particularly in organized tournaments. For example, in one popular multiplayer online game, League of Legends from Riot Games (www.leagueoflegends.com), from a base of millions of active users, there are a handful of players who have become famous for displaying exceptional skill and strategy. When these players engage in a game session, League of Legends enables other players to be spectators to the active game session. However, the current spectator experience is somewhat limited. Accordingly, systems and methods to enable an improved spectator experience would be desirable.

SUMMARY OF THE INVENTION

The field of the invention relates to multi-user online gaming systems, and more particularly to systems and methods that enable a spectator's experience for online active games.

In a preferred embodiment, an online multiuser game system includes an online game session server system communicatively coupled to a public network for access by a plurality of users to establish a plurality of real-time interactive games sessions. The online multiuser game system further includes a spectator server communicatively coupled to the online game session server system and configured to enable a user to view and time shift an active game session.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1a is an exemplary diagram of a multiuser online game system known in the art;

DETAILED DESCRIPTION OF THE PREFERRED EMBODIMENTS

State of the Art Systems

Turning to FIG. 1a, a large multiuser online game system 100 over a public network 1050, such as the Internet, is shown. An example of such a game system 100 known in the art is League of Legends (www.leagueoflegends.com). League of Legends is a session-based, multiplayer online battle-arena game where rival teams compete against one another for victory on highly stylized battlefields and landscapes. Users can install a League of Legends game client on their personal computing device 110 to establish a game session over the public network 1050 with the game system's 100 datacenter 130, which provides the real-time online game interaction with the plurality of users 110.

Figure 1B:
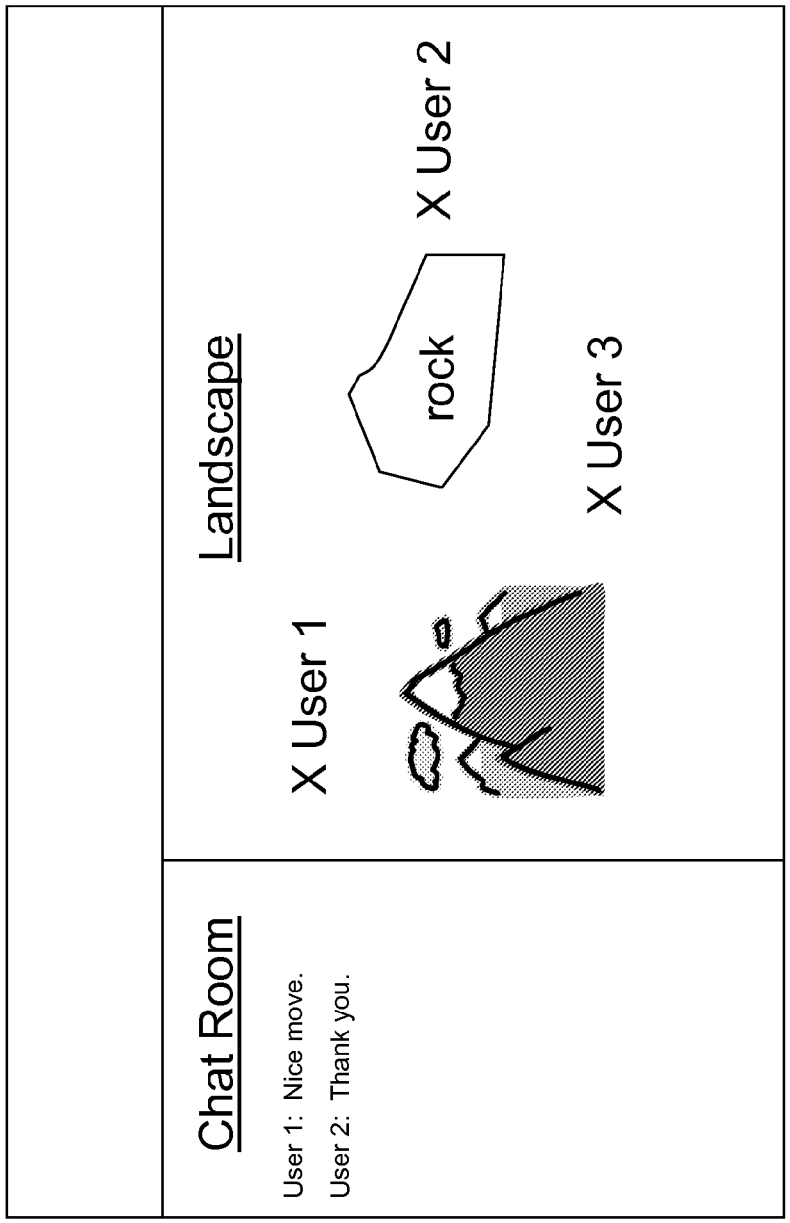
FIG. 1b is an exemplary user interface known in the art.

Turning to FIG. 1b, an example game client 110 user interface is shown. In online games such as League of Legends, each user is generally represented by a personalized graphical avatar in the user interface, also referred to as "champion," (shown as "X" in this example), and the game client 1100 user interface may show the logical position of one user's avatar, X User 1, relative to another, X User 2 and X User 3 within a virtual landscape. The game client 1100 user interface may also include a chat interface ("Chat Room") that enables participating users to communicate with one another beyond interactions with the avatars (Xs).

The datacenter 1300 includes a plurality of server systems operating on a plurality of server machines communicatively coupled to each other via the public network 1050 and/or a secure virtual private network (not shown). The server machines each include a processor, memory, an operating system, an input/output interface and network interface all known in the art. In accordance with a preferred embodiment, the datacenter 130 includes, among other things, a game session server system 140.

Figure 1C:
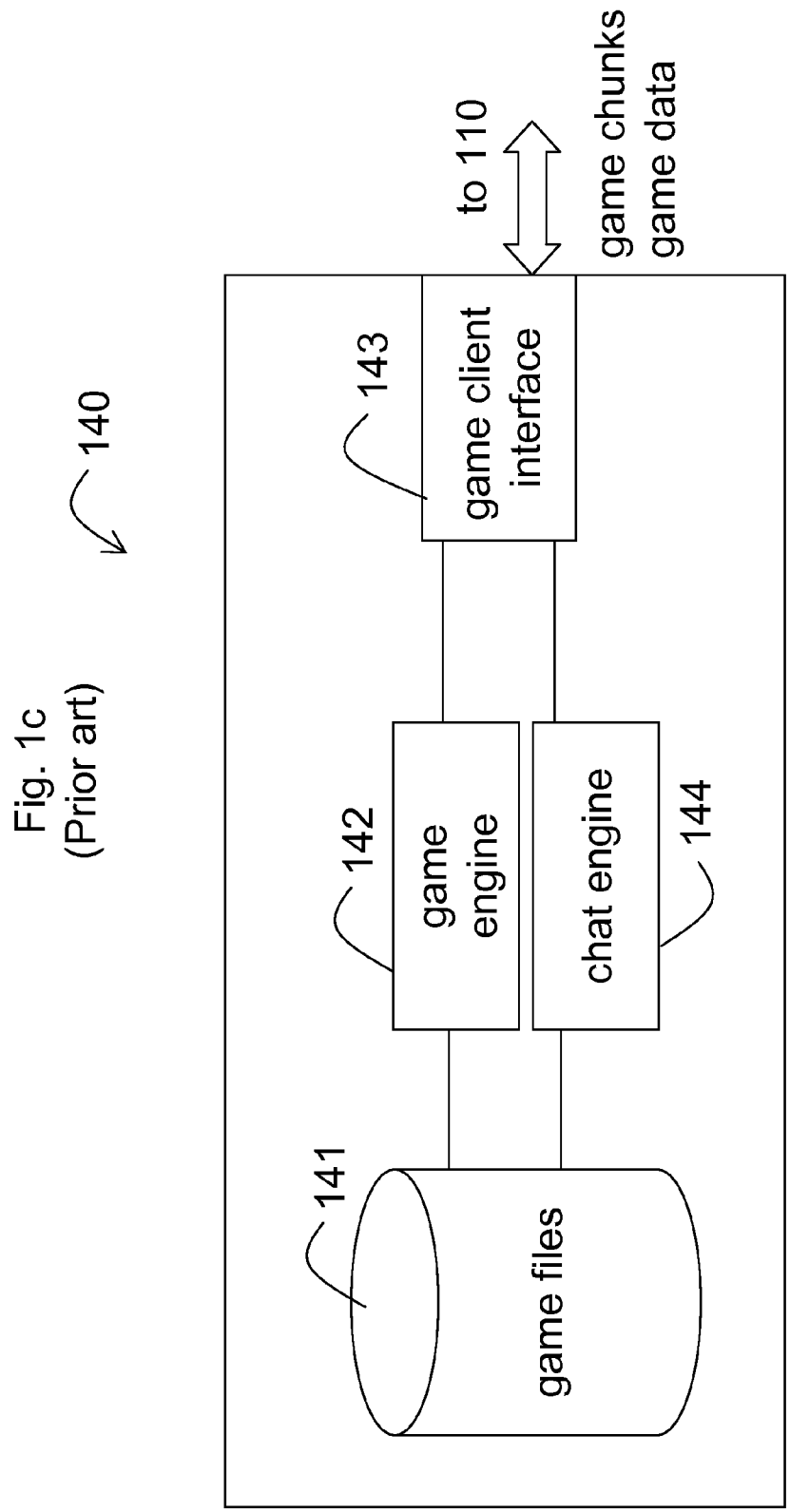
FIG. 1c is an exemplary diagram of a game session server known in the art.

Turning to FIG. 1c, a more detailed diagram of a game session server system 140 known in the art is shown. The game session server system 140 provides the game interaction with the users' game client 110 via the game client interface 143, which is generally an application interface known in the art accessible over the public network 1050 by the game client 110, e.g., in a traditional client server model. A game engine 142 coupled to the game client interface 143 is included to manage the interaction between the plurality of users 110 and the game system 100. As one of ordinary skill in the art can appreciate, highly stylized user interfaces often contain graphics requiring large amounts of data. Transmitting such graphics over the public network 1050 may cause slow performance due to the limited available bandwidth of the public network 1050. One approach to address this is to have the graphics rendered by the game client on the user's computing device 110. To account for movements and changes to players in the game, only certain information is transmitted over the public network 1050 between the game clients 110 and the game engine 142, e.g., coordinates of various players within the landscape of the game.

Figure 1D:
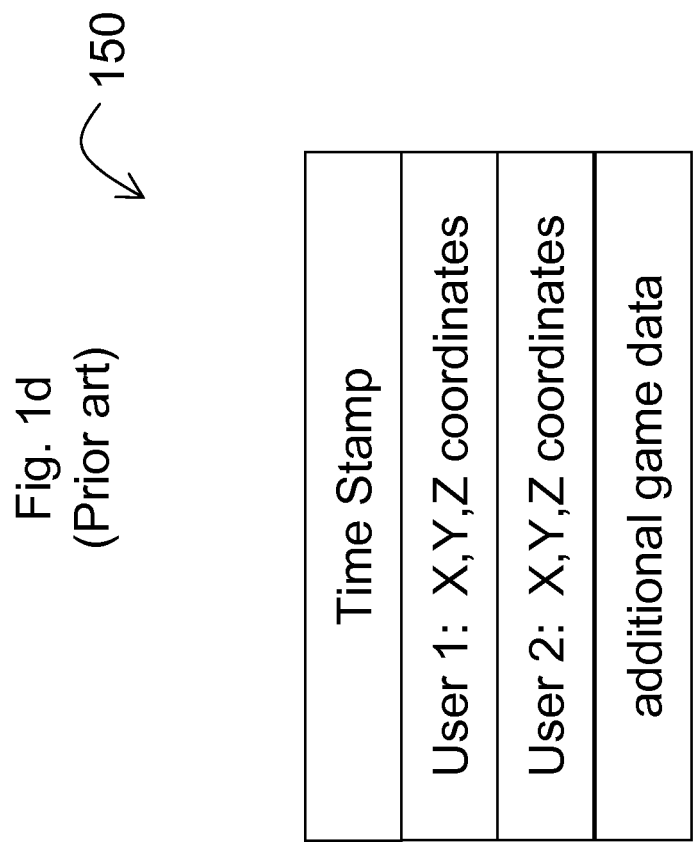
FIG. 1d is an exemplary diagram of a data packet known in the art.

Turning to FIG. 1*d*, such data can be transmitted efficiently in blocks of data packets collectively known as "chunks," an example format of which is shown in FIG. 1*d*. A chunk generally includes the latest coordinates within the virtual landscape of certain users, a time stamp to enable the game engine 142 to synchronize data among players, and additional game data to facilitate rendering, such as weapons and powers that have been added or removed or other information to reflect the latest state of a player's avatar. A game client 110 will use the data in the chunk to render, among other things, the appropriate graphics and visual representations of the positioning of the avatars within the virtual landscape. If a user makes a change to its avatar state on its client 110, e.g., if the user moves its avatar or adds a power, one or more chunks may be transmitted back to the game engine 142 to update the remaining players and to update rendering on their machines 110. The chunk enables responsive, high-performance real-time game play with highly stylized graphics over a public network 1050 of limited bandwidth since the graphics are rendered on the game client and only limited data is transmitted for game interaction. In a preferred embodiment, a chunk for a particular user will not include all data for the game session but only data limited to the user's view. For example, turning to FIG. 1*b*, a rock or tree may hide another avatar in the virtual landscape from the first user's view. To maintain this context and competitive play, the hidden user's coordinates may not be included in the chunks sent to the first user until the hidden user is revealed during game play (e.g., the other user may move its hidden avatar into an opening unblocked by the rock or tree).

Turning back to FIG. 1*c*, the game session server system 140 further includes a chat engine 144 known in the art that enables the various users 110 participating in a particular game session to communicate with each other via text messages. Audio, pictures, and multimedia may also be exchanged with the chat engine 1440. Both the game engine 142 interactions as well as the chat messages exchanged can be recorded and stored in a game files database 1510. This enables, among other things, replay and history analysis by not only the users but also the administrator and other systems as will be described below.

Preferred Systems

Figure 2:
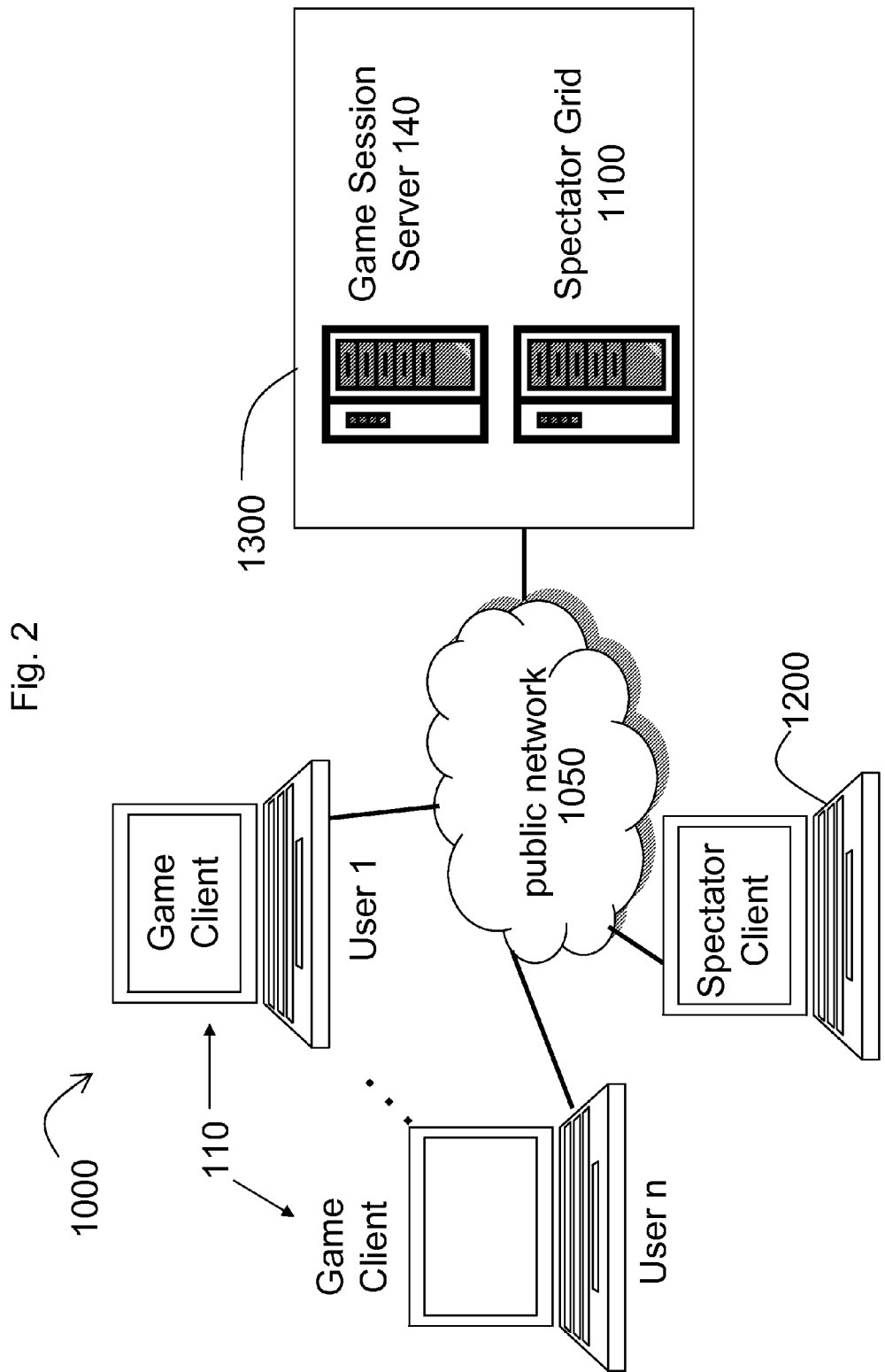
FIG. 2 is an exemplary diagram of a multi-user online game system in accordance with a preferred embodiment of the present invention.

Turning to FIG. 2, an online multi-user game system 1000 in accordance with a preferred embodiment of the present invention is shown. The system 1000 provides an enhanced spectator experience as will be described below. System 1000 includes a datacenter 1300 having a game session server system 140 as described above. The system 1000 also includes game clients 110 configured to access data center 1300 over the public network as described above. In accordance with a preferred embodiment, the system 1000 further includes a spectator grid 1100 operatively coupled to the game session server system 140 that enables a user with a spectator client 1200 to access the data center 1300 and select an active game session to view as a spectator. The spectator grid 1100 is also implemented as a server system. The spectator client 1200 includes a similar graphics rendering application as the game client 110 but with no ability to actively participate in the selected game.

Figure 3:
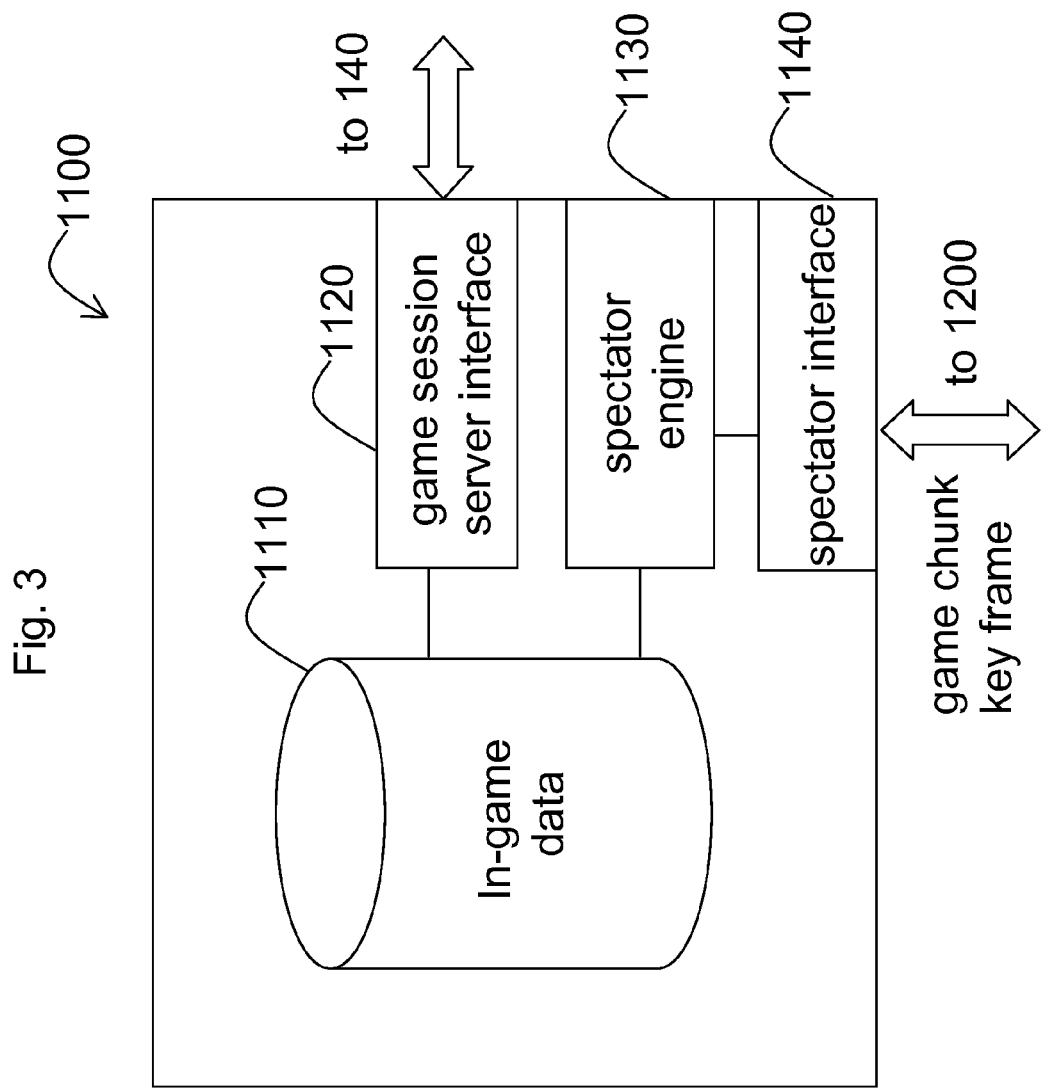
FIG. 3 is an exemplary diagram of a spectator grid in accordance with a preferred embodiment of the present invention.

Turning to FIG. 3, a detailed diagram of a spectator grid 1100 is shown. The spectator grid includes an in-game database 1110 that is configured to receive game data, e.g., game chunks, from the game session server system 140 via a game session server interface 1120. These game chunks may include global data, e.g., positioning coordinates for avatars whether hidden or not, within the virtual landscape of a game session. Preferably, the in-game database 1110 utilizes an in-memory coherence cache, thereby enabling faster querying of the database in real time. The spectator grid 1100 further includes a spectator engine 1130 configured to interface with a spectator client 1200 via a spectator interface 1140 and provide game data to the spectator client 1200 from the in-game database 1110.

Preferred Processes

Figure 4:
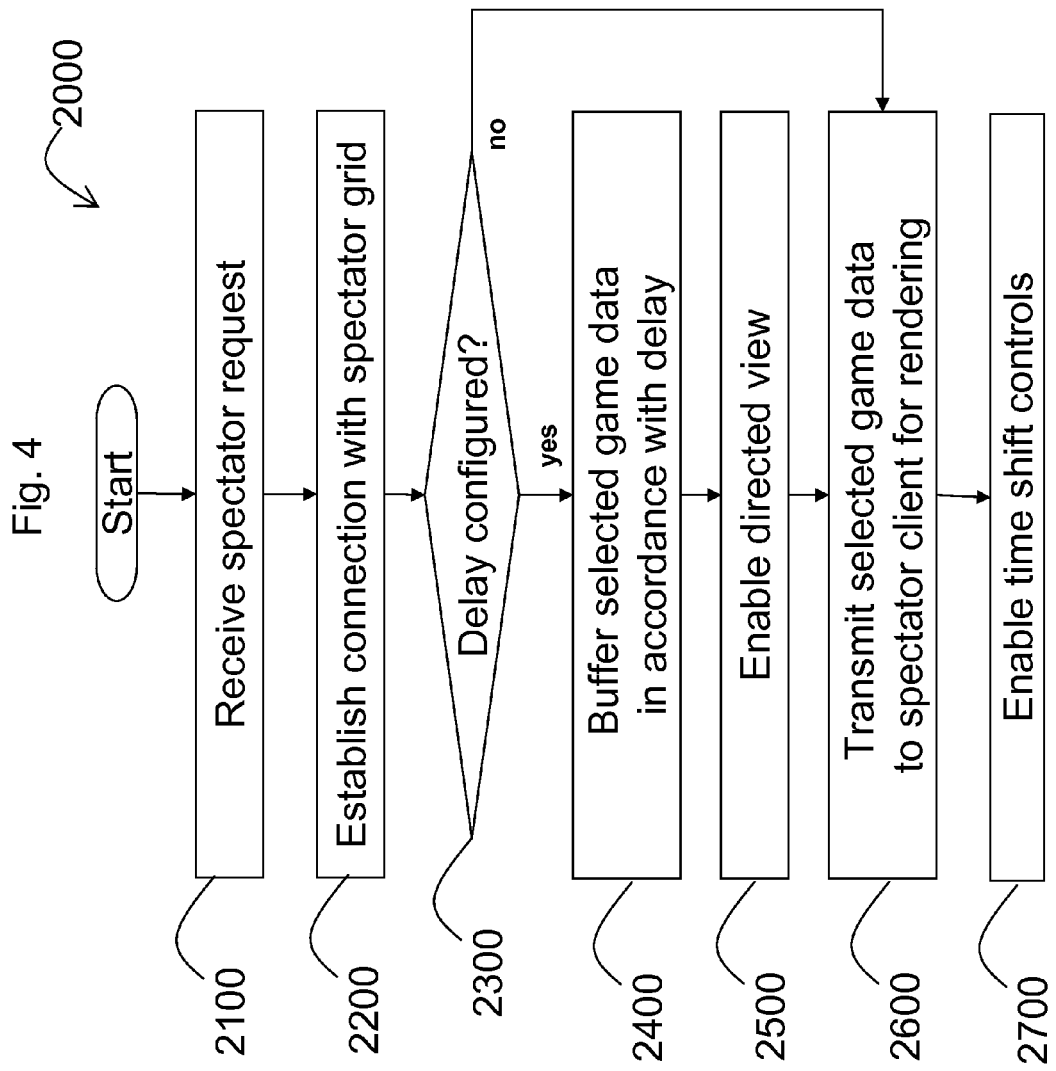
FIG. 4 is an electronic process enabling a spectator experience for multiuser online games in accordance with a preferred embodiment of the present invention.
Figure 5:
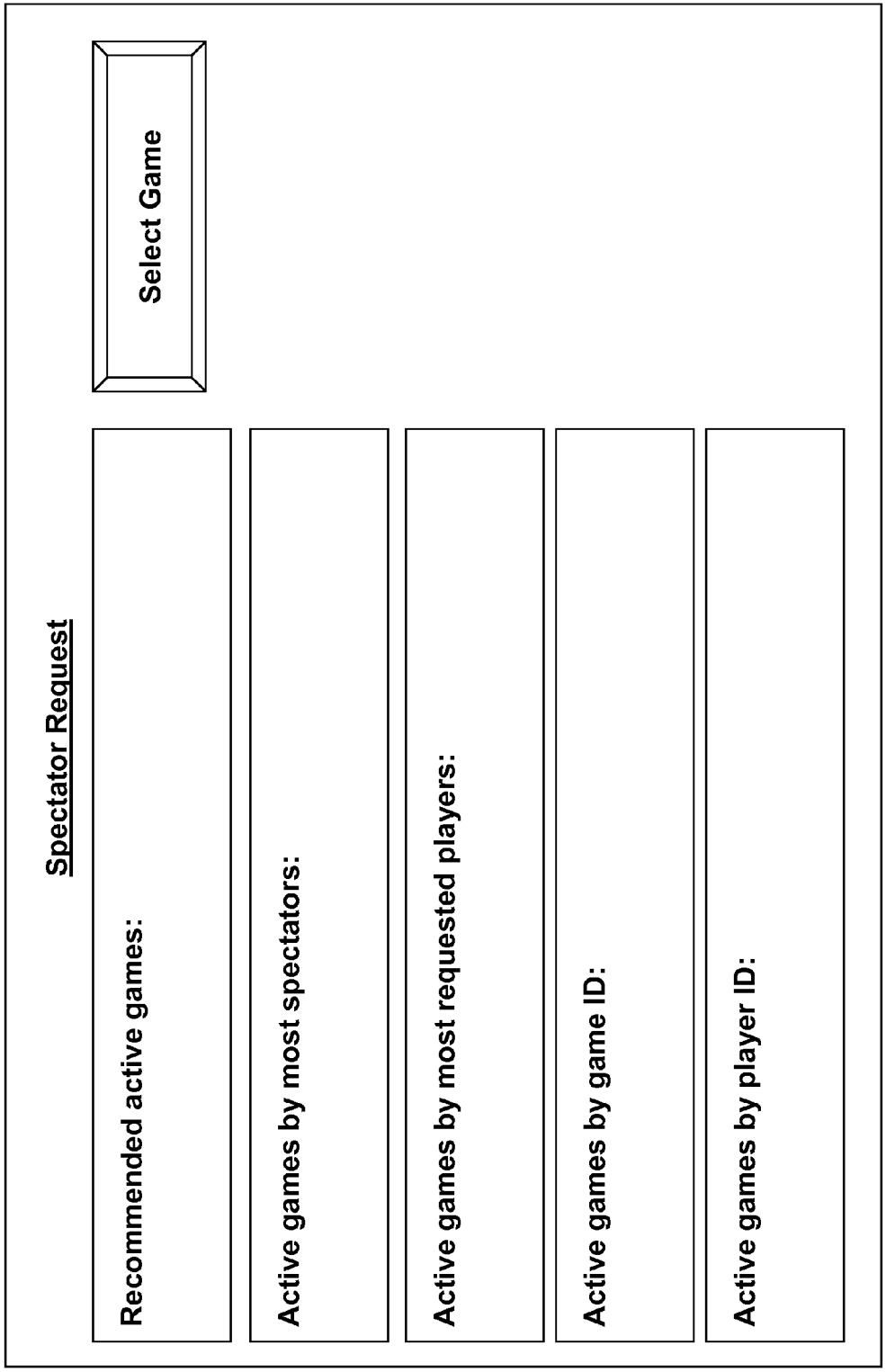
FIG. 5 is a user interface in accordance with a preferred embodiment of the present invention.

Turning to FIG. 4, a process 2000 in accordance with a preferred embodiment is shown. As mentioned above, fans of certain multi-user online games may wish to be spectators of particular active games, as with any competitive game. To address this need, the game system 1000 enables a user to view active game sessions within the system 1000. Turning to FIG. 5, an exemplary interface for a spectator client 1200 is shown. When a user connects to the data center 1300, one or more lists of active games are provided. They can be grouped into a variety of categories, including, active games having the most spectators, active games played by most requested players, i.e., players that most spectators have requested viewing of, e.g., players known as having exceptional skills. The data that enable these lists can be tracked and deduced by previous spectators' selections, which can be stored in the database 1110 of the spectator grid 1100. Games can also be presented by specific game identification and/or player identification (regardless of whether such a player is well-known). Moreover, the game system 1000, e.g., the spectator grid 1100, can monitor certain activities within an active game. For example, the spectator grid 1100 can monitor for games having scores that are very competitive, for games that have a particularly high number of known or higher tiered champions, for players that are playing at a particularly high level, and/or for players that are demonstrating particularly unusual and/or entertainment techniques or moves. The spectator grid 1100 can identify such games as recommended games for potential spectators. Games can also be listed in random order. Games can also be listed by particular events, e.g., an organized tournament.

Figure 6:
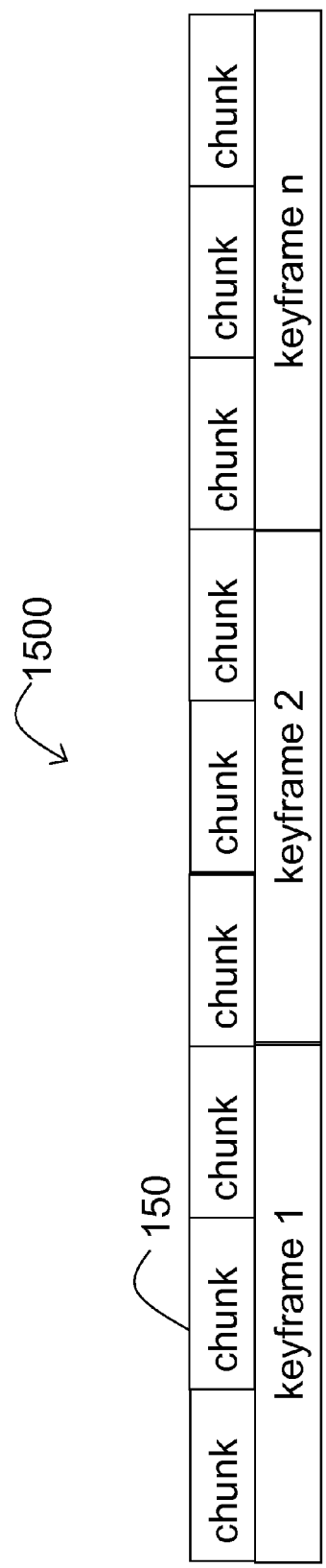
FIG. 6 is a data packet in accordance with a preferred embodiment of the present invention.

Turning back to FIG. 4, once a spectator has selected a particular active game to view, the spectator grid 1100 receives the request (Action Block 2100) and establishes a data connection with the spectator's client 1200 (Action Block 2200) to transmit game data to the client 1200 in streaming fashion (Action Block 2600) to be rendered on the spectator client 1200 in real-time or near real-time to the selected active game. Turning to FIG. 6, an example format 1500 is shown for game data transmitted by the spectator grid 1100 to the spectator client 1200. What is shown, in a preferred embodiment, is that game chunks 150 are sent to the spectator client 1200 with similar structure and content to the game chunks 150 sent to game clients 110. One difference in the preferred embodiment is that the game chunks 150 sent to the spectator client 1200 includes complete data for the active game being viewed. For example, all player positions are provided, including the ones that are hidden, so that the spectator is provided an omnipresent view.

Once the chunks 150 are received, the spectator client 1200 can generate the same graphics and visual representations of the active game in real-time or near real time of the active game.

Also included in the data format 1500 are keyframes, which are effectively snapshots of a particular game at a particular point in time. A keyframe is aligned with a fixed group of chunks, e.g., 3, to define a time interval using the time stamps in the chunks 150. A keyframe can be generated by creating a chunk 150 that includes game data packets for all players that exist at a given time. When a keyframe is loaded onto a spectator client 1200, then the latest game data, e.g. the latest scene, along with all of the entity data that are known by the client 1200 at that time, e.g., avatar and computer controlled object data, are deleted. The keyframe can then be played back as a regular chunk 150, which renders the entity data that exist at that point in time at their correct positions. The chunk 150 that corresponds to the keyframe's point in time is then loaded as the next chunk to render. From there, chunks 150 can be rendered in chronological order. The amount of game play time represented by a chunk 150 is configurable by the system's 1000 administrator, and is preferably approximately 30 seconds.

One aspect of the keyframes is the enablement of time-shifting features for the live game (Action Block 2700). For instance, an active game session rendered from the chunks 150 at a previous point of time can be quickly simulated by jumping to specific keyframes instead of individual chunks 150. In a preferred embodiment, when jumping to specific keyframes, much of the game processing can be disabled, such as rendering and sound, to enable faster jumps. Once a keyframe is reached, then normal playback and rendering is enabled, as described above.

Figure 7:
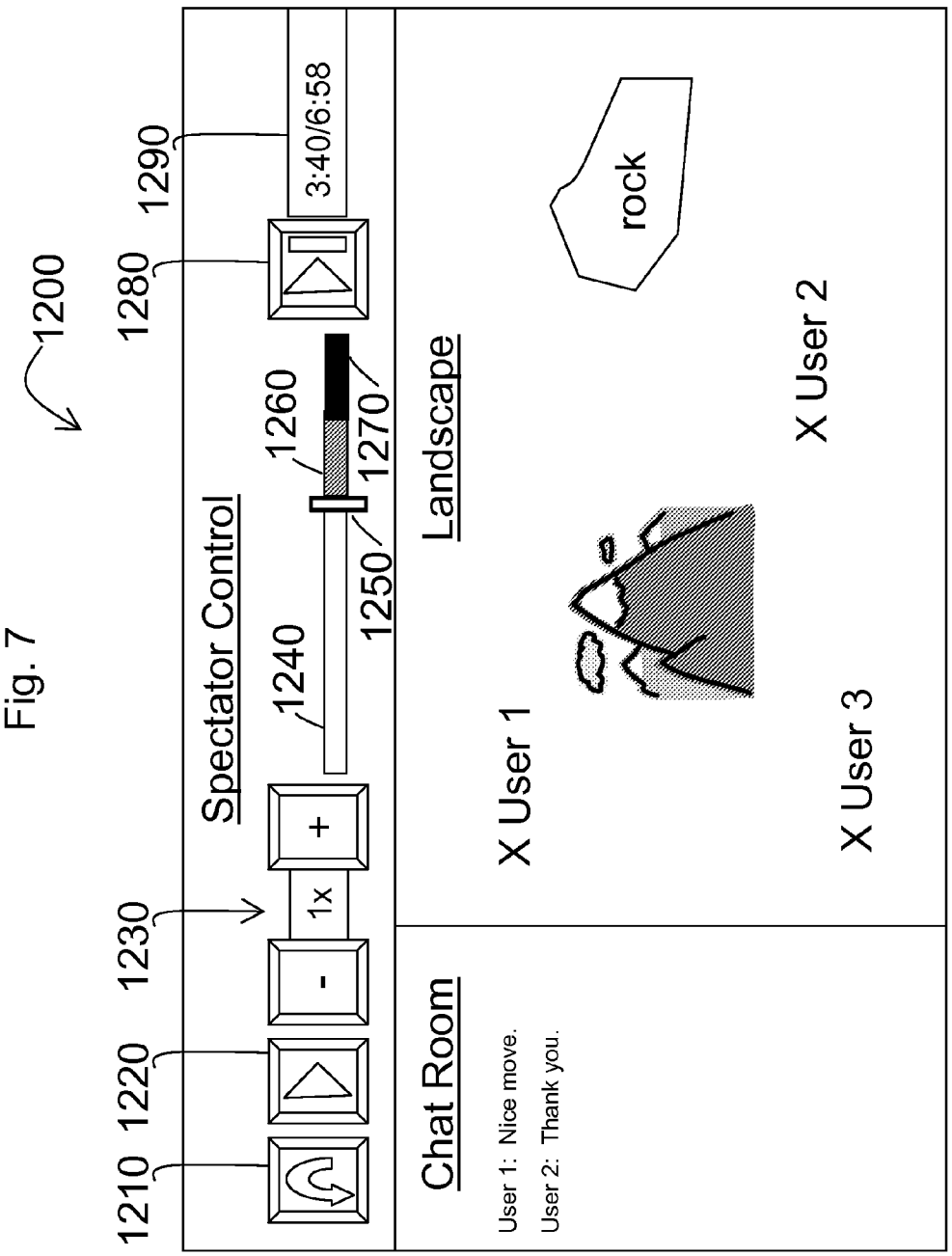
FIG. 7 is a user interface in accordance with a preferred embodiment of the present invention.

Turning to FIG. 7, to illustrate exemplary time shifting controls enabled by system 1000 (Action Block 2700), a preferred user interface for a spectator client 1200 viewing an active game session is shown. As mentioned above, the chunks 150 enable the spectator client 1200 to render real-time, or in near real-time fashion, game play from an active game, but with an omnipresent view that enables the spectator to view all game play within the virtual landscape. Moreover, certain time-shifting controls can be enabled. The following are examples.

Jump Back 1210—This button allows the spectator to jump back a fixed amount of time, similar to an "instant replay" feature. In this case, the spectator client 1200 can jump to the keyframe of the requested point in time, and render the associated game chunks 150 as described above.

Play/Pause 1220—This button will pause the game if it is playing, or play the active game session from the specific point in time where it was last paused, if it is paused.

Playback Speed 1230—The "+" and "−" buttons will increase and decrease the speed that the game is playing at, respectively, and the playback speed "1×" can be displayed. The use of keyframes may be particularly helpful in performance of this feature, as described above.

Time control scrubber bar 1240—this area represents the time that is in the past for the game. It can be clicked on to set the time back to an earlier time. A tooltip that shows what time the user will jump to when hovering over this bar can be included (not shown).

Time control scrubber position 1250—This is the current point in time that is being played.

Viewed time 1260—This area of the bar indicates time that is in the future that is before the latest point in time that the user has already seen. It can be clicked on to jump to a point in time in the future.

Unviewed time 1270—This area indicates the period of time that is available to jump to but that the user has not seen yet. This time can also be clicked.

Jump to latest 1280—This button, when pressed, will jump to the latest point of time that the user has viewed, as indicated by the highlighted position at the end of 1260. If the user is already playing back from this point, it will move the user to the latest point in time available, at the end of 1270.

The display at 1290 indicates the current point in time that the user is watching and the maximum available time that the user can access, respectively.

In addition to the controls above, a spectator may select any area of the virtual landscape, which can be expansive, to view at any time, and can further select a particular player for the camera view to automatically follow. For instance, the spectator can mouse click on a particular player in the game, and the spectator's camera view can follow that player automatically. This can be achieved by having the spectator client 1200 focus on that player's data within the received chunks, either real-time, or at a selected time. Further, the spectator can switch from player to player at any time.

Turning back to FIG. 4, because the spectator's view is omnipresent, a player may be able to use that spectator's view to its advantage to obtain additional information about other players in the game. To prevent this, a delay may be configured (Decision Block 2300). If configured, then the spectator grid 1100 may buffer the chunks by a certain amount of time, e.g., 30 seconds, before transmitting such data to a spectator, thereby enabling a delay, which would remove the incentive for an active player to attempt to view the game in spectator mode.

Moreover, the delay enables the spectator grid 1100 and/or client 1200 to analyze the most recent data and notify the spectator of upcoming events that may be of interest to the spectator. For instance, the virtual landscape of a game may be too large to view in detail in its entirety on a spectator client's 1200 screen, and the various avatars may be moving in any different direction. At any given moment, an event could occur, such as a special move or a special achievement outside the spectator's current camera view. Example events include champion defeats, champion damage, events that lead up to champion defeat and/or damage, and game specific events such as the completion of important team-based objectives, and status of key objects within the game, such as status of key computer controlled avatars or objects. To maintain focus on the key events, the spectator grid 1100 and/or client 1200 can be configured to monitor for such activities within the buffer (which occur on the spectator's client 1200 at a configurable time later, e.g., 30 seconds) and cause the spectator's view to focus on those specific activities when they develop and/or occur on the spectator's client 1200. This directed view (Action Block 2500) will ensure that the spectator does not miss key events as they unfold.

Figure 8:
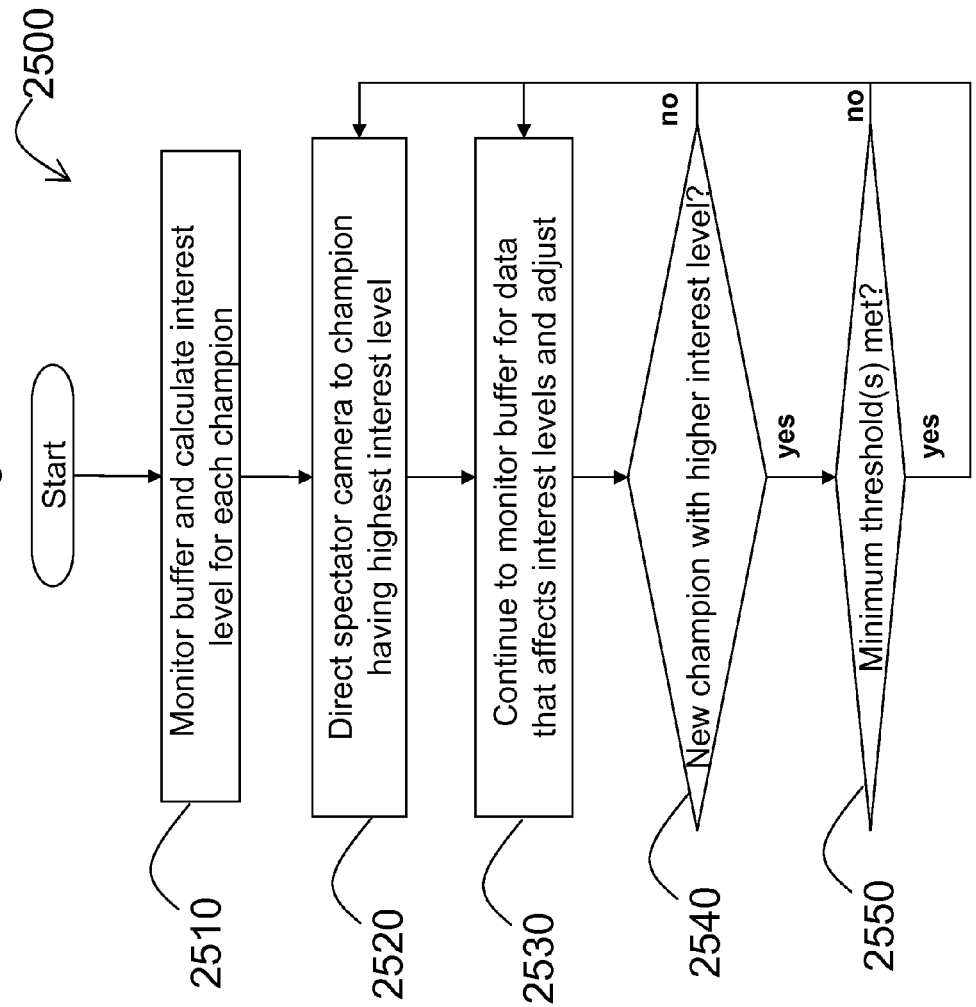
FIG. 8 is an electronic process directed towards a directed spectator view in accordance with a preferred embodiment of the present invention.

Turning to FIG. 8, a more detailed illustration of a directed view process (Action Block 2500) is shown. In general, one approach to ensure that a spectator's view (e.g., as shown in FIG. 7) is focused on key activities and events within an active game is to follow one or more champions that are associated with those events and activities. Which champion to follow can be dictated by a calculated "interest level" for each champion. Generally, a champion's interest level correlates with the distance between that champion and the key activities and events described above when they occur and/or as they develop. In League of Legends, factors used to calculate a champion's interest level include: proximity of other champions within the virtual landscape; current health level; presence of debuffs (i.e., an effect given to a champion that decreases performance); participating in future events like damaging and/or defeating other champions or important team objectives; interaction with terrain elements, and champion activities like stealthing and recalling to base.

In a preferred embodiment, the buffered data from Action Block 2400 is monitored (e.g., in 10 second increments) for data, such as that described above, to calculate an interest level for each champion within an active game (Action Block 2510). The spectator grid 1100 and/or spectator client 1200 then directs the spectator's client 1200 view to follow the champion having the highest interest level (Action Block 2520). The view is preferably adjusted to also encompass nearby champions as well, to provide as full view of the activities as possible. The spectator grid 1100 and/or spectator client 1200 then continues to monitor the most current buffer for data that affects the interest level calculations (Action Block 2530).

If activities develop during the game that cause another champion to have a higher interest level, then the spectator grid 1100 and/or spectator client 1200 may shift the spectator client's 1200 view to the new champion. However, if the identity of the champion with the highest interest level shifts frequently, it may not be desirable to have the spectator client's view 1200 shift at the same frequency. To address this, hysteresis may be incorporated. For instance, if a new champion gains status as having the highest interest level (Decision Block 2540), then additional thresholds are evaluated to assess whether to shift the spectator's client 1200 view (Decision Block 2550).

A number of threshold values may be utilized. For instance, even if a new champion gains status as having highest interest level, a spectator's client 1200 view may not adjust until the new champion's interest level is a certain percentage higher over the interest level of the previous champion with the highest interest level (e.g., 20%). Another threshold is a fixed value that the interest level of the new champion must exceed. These thresholds may decay over time after each shift in view and eventually settle at a minimum value until the next shift in view.

These thresholds, in combination with the interest for important future events ramping up linearly, ensure that the camera will switch early and provide a lot of context to an event during periods of low interest elsewhere in the virtual landscape. When there are high levels of activity occurring in other locations, the shift may not occur until just a few seconds before the upcoming important event occurs to ensure that the spectator client's 1200 view captures all key events properly.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for online gaming systems; however, the invention can be used for any multi-user online system in general. Additionally and obviously, features may be added or subtracted as desired. Accordingly, the invention is not to be restricted except in light of the attached claims and their equivalents.

What is claimed is:

1. An online multiuser game system, comprising:
   an online game session server system communicatively coupled to a public network for access by a plurality of users to establish a plurality of real-time interactive games sessions;
   a spectator server communicatively coupled to the online game session server system and configured to enable a user to view and time shift an active game session;
   wherein an interactive game session includes a plurality of electronic avatars, and the spectator server is further configured to enable a user to select an avatar for the user's view to follow; and
   wherein the spectator server is further configured to calculate an interest value associated with each avatar and direct the user's view to the avatar having the highest interest value.

2. The online multiuser game system of claim 1, wherein the spectator server is further configured to monitor data affecting the interest values and shift the view to another avatar if it gains the highest interest value.

* * * * *